July 29, 1969 B. E. SHLESINGER, JR 3,458,708

LIGHT SENSITIVE CROSS-BAR SWITCHES HAVING A PHOTOCELL AT EACH CROSS-POINT

Filed Dec. 20, 1967 2 Sheets-Sheet 1

INVENTOR

Bernard Edward Shlesinger Jr.

INVENTOR

Bernard Edward Shlesinger Jr

United States Patent Office 3,458,708
Patented July 29, 1969

3,458,708
LIGHT SENSITIVE CROSS-BAR SWITCHES HAVING A PHOTOCELL AT EACH CROSS-POINT

Bernard Edward Shlesinger, Jr., 3906 Bruce Lane, Annandale, Va. 22003

Filed Dec. 20, 1967, Ser. No. 692,166
Int. Cl. H01j 39/12
U.S. Cl. 250—220 18 Claims

ABSTRACT OF THE DISCLOSURE

A cross-bar switch comprising a panel board which includes a switching grid having a plurality of $x$–$y$ coordinates, each of the $x$ coordinates of the switching grid having a plurality of interconnected and simultaneously operated wave transmitting means, each of the $y$ coordinates of the switching grid having a plurality of interconnected and simultaneously operated wave transmitting means, wave sensitive means positioned at each intersection of the $x$ and $y$ coordinates and an $x$ and a $y$ coordinate transmitting means at each of said intersections in close proximity to said wave sensitive means, means for selectively operating one of the plurality of interconnected wave transmitting means forming an $x$ coordinate and means for selectively operating one of the plurality of interconnected wave transmitting means forming a $y$ coordinate, means connecting each of the wave sensitive means to an electrical component and said wave sensitive means sensitive to the combined intensity only of one of the wave transmitting means of one $x$ coordinate and one of the wave transmitting means of one $y$ coordinate whereby when any one of the plurality of wave transmitting means of the $x$ coordinate and any one of the wave transmitting means of the $y$ coordinate are simultaneously operated, the wave sensing means at the intersection thereof will cause its electrical component to function; and:

A cross-bar switch comprising a panel board and a series of wave form transmitting members positioned in the board for transmitting a series of waves in parallel spaced relation across the board, a series of wave form valves positioned in the panel in parallel spaced relation to each other and in cross relation to the series of transmitted waves to form a grid arrangement having spaced intensity areas where the waves and wave form valves intersect, means for selectively operating each of said transmitting members and each of said wave form valves, said spaced intensity areas each having located therein, a wave sensitive element, sensitive only to the intensity of one of the transmitted series of waves when the wave form valve at its intersection is operated, and means connecting each of the wave sensitive elements to an electrical component.

Historical background

This invention relates to cross-bar switching mechanisms and particularly to those which are responsive to light or similar wave-type energy and is a continuation-in-part of my applications Ser. No. 413,903, now Patent No. 3,360,657 filed Nov. 25, 1964 and Ser. No. 678,585 filed Oct. 27, 1967.

This application differs from my previous applications in that it includes:

(1) A grid comprising a plurality of leads which intersect each of which is provided with a plurality of wave sources located at the intersections so that each intersection comprises at least two light sources, one for the $x$ coordinate and one for the $y$ coordinate, operating an electrical component only when the pair of lights or wave sources at each intersection are operating simultaneously;

(2) A cross-bar switch in which the wave transmitting means may include a series of wave carrier devices such as fiber optic rods or Lucite rods or the like extending across the board in parallel relationship with light valve means crossing the rods and forming a grid of matrix. When a wave is transmitted across the board, a wave sensor positioned at the intersections will sense the wave when a light valve or wave valve is operated so as to permit the wave to reach a sensing device such as a photocell etc. Variables can be worked in merely by controlling the intensity of the wave and permitting the light sensing device to operate under different wave intensity conditions so long as the valve at a specific intersection is opened;

(3) A cross-bar switch in which a series of spaced parallel lines are used each carrying linearly spaced wave or light transmitting devices and in which the wave transmitting devices of any line are positioned at intersections and these intersections are provided with wave-blocking means such as a reciprocating slide or valve crossing the lines in a grid pattern so as to control the passage of the wave or light to a sensing device for operating an electrical component.

Objects and summary

It is therefore an object of this invention to provide a cross-bar switch mechanism which is fast and reliable.

Another object of this invention is to provide a cross-bar switching mechanism which requires few moving parts.

Another object of this invention is to provide a cross-bar switch which can be manufactured from inexpensive materials readily available on the market.

Another object of this invention is to provide a cross-bar switching mechanism which has great flexibility for use in programming or communication systems.

A further object of this invention is to provide a cross-bar switching system which combines an electrical shift registering valving mechanism with a wave, signal, or light transmitting member so as to eliminate problems with respect to sensitivity of the sensing device and control of the coponents associated therewith.

Another object of this invention is to provide a cross-bar swiching system which is electro-mechanical for ease in repair.

Still a further object of this invention is to provide a cross-bar switching mechanism which provides means for varying the intensity of the wave, signal, or light transmitting member so as to increase the number of operating systems available.

In summary, this invention pertains specifically to light, signal, or wave-type responsive cross-bar switching mechanisms which for a given area can accommodate a greater number of electrical components or circuits either by varying the intensity of the wave, signal, or light; or varying the valving structure controlling the amount of wave energy, signal energy, or light energy reaching the sensitive device.

These and other objects of this invention will be apparent from the following description and claims.

Figures 1, 2, 3, 4, 5:
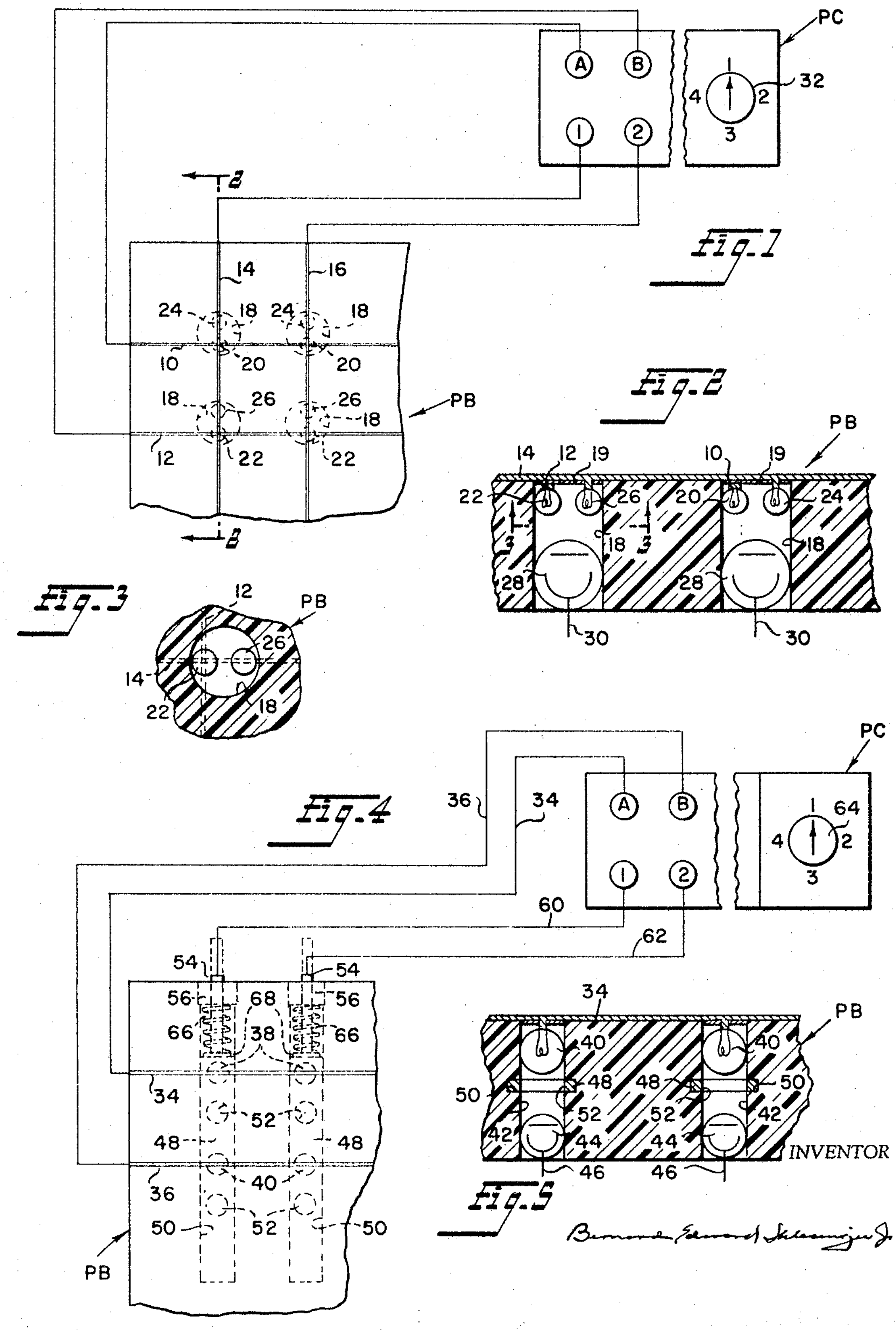
FIGURE 1 is a fragmentary plan view illustrating the cross-bar panel board and its controlled panel.
FIGURE 2 is a cross-sectional view taken along the line 2–1–3 in FIGURE 1 and viewed in the direction of the arrows.
FIGURE 3 is an enlarged fragmentary view in cross section taken along the lines 3—3 in FIGURE 2 and viewed in the direction of the arrows.
FIGURE 4 is a fragmentary plan view illustrating a modified cross-bar panel board and its control panel.
FIGURE 5 is a perspective view of a fragment of the panel board illustrated in FIGURE 4 enlarged and showing portions in cross section.

In the drawings which illustrate the various embodiments of the invention:

FIGURES 1 through 3

In FIGURE 1, the panel board PB is provided with a series of electrical leads 10 and 12 running horizontally and 14 and 16 running vertically, areas of intersection including receptacles 18 are provided in the board for receipt of a sensing mechanism such as a photocell. Covers 19 are provided for the receptacles 18.

Electrically connected to leads 10 and 12 are light sources 20 and 22. Electrically connected to leads 14 and 16 are light sources 24 and 26. Within the receptacles 18 are provided photocells 28 having leads 30 connected to electrical components not shown.

The leads 10 and 12 are connected to a control panel PC and specifically to push buttons A and B. The leads 14 and 16 are connected to the control panel PC and specifically to push buttons 1 and 2. The leads 10, 12, 14 and 16 may be printed circuits.

A variable intensity control knob 32 is provided on the control panel for controlling the intensity of the light transmitted by the light sources 20, 22, 24 and 26.

Operation

In operation, the photocell 30 will generate a current sufficient to operate an electrical component providing that the threshold of the photocell is higher than any one of the light sources 20, 22, 24 and 26. When push button A and push button 1 are depressed simultaneously, the lights 20 and 24 will light up simultaneously and the photocell 28 will operate an electrical component connected to the line 30 (not shown). It will be obvious that varying the intensity control 32 will permit operation of various electrical components tied into the lead 30 having different thresholds in the manner described in application Ser. No. 678,585, filed Oct. 27, 1967. It will be further obvious that colored filters, different size apertures, and the like may be used in the area of each lamp for controlling the intensity in the same manner as set out in the aforementioned application. The operation of the buttons on the control panel is basically the same as described in my earlier applications.

FIGURES 4 through 7

In FIGURE 4, the panel board PB is provided with electrical leads 34 and 36 which extend horizontally across the board and carry a series of wave transmitting devices or signaling devices or lights 38 and 40 as best illustrated in FIGURE 5. The wave or signal sources 38 and 40 are positioned within receptacles 42. The receptacles 42 receive photocells 44 having electrical conductors 46 extending therefrom.

Figure 6:
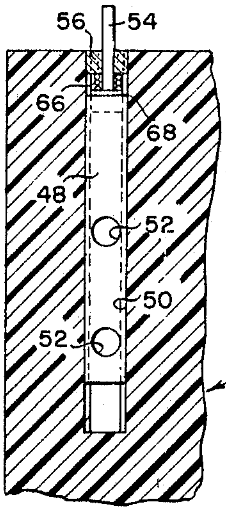
FIGURE 6 is an enlarged cross sectional fragmentary view showing one of the slides of the invention.
Figure 7:
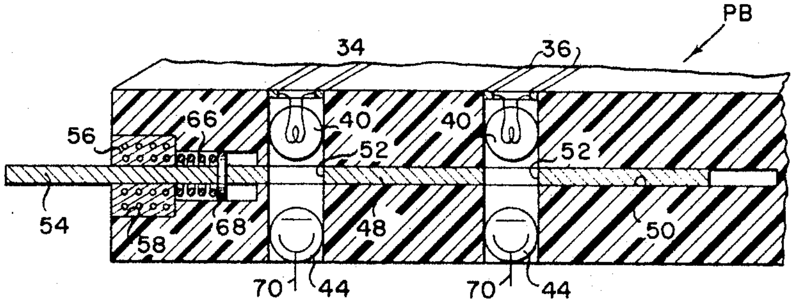
FIGURE 7 is an enlarged fragmentary perspective view a portion of which is shown in cross section.

A series of valve slides 48 are provided which extend transversely of the leads 34 and 36. A series of slots 50 are provided for receiving the valve slides 48. The valve slides 48 are provided with openings 52 best illustrated in FIGURES 6 and 7. The slide valve slot 50 is provided with sufficient clearance for reciprocating the slide therein. The valve slide 48 is formed with a plunger end 54 as best illustrated in FIGURES 6 and 7. The plungers 54 form the armatures of the solenoids 56. The solenoids coils 56 are disposed in the recesses 58 in the panel board PB.

The leads 34 and 36 extend to a control panel PC and specifically to push buttons A and B. The solenoid coils 56 are connected by leads 60 and 62 to the control panel PC and specifically to buttons 1 and 2. The intensity of the light sources 38 and 40 may be controlled by an intensity control dial 64 mounted in the control panel PC.

In the recesses 58, are positioned springs 66 which abut spring abutment members 68 on the valve slides 48. The springs maintain the valve slides 48 normally in light locking position.

Operation

In operation, when for example button A is depressed, all of the lights 38 on the lead 34 will be turned on. When button 1 is simultaneously depressed, the solenoid coil 56 will draw the valve slide 48 so as to bring the opening 52 therein into registry with the proper receptacle 42. This will then permit the light to be transmitted to the photocell 44 within that particular receptacle and thus generate a current to be carried by the connecting lead 70 to an electrical component (not shown). It will be obvious that instead of single slide valves operating in the matrix system, individual valving means may be provided at each receptacle and innerconnected in series by an electrical lead so that each series of valves across the panel board PB will operate simultaneously upon energization. It will also be obvious that the openings 52 may be provided with a lens mechanism which may be varied for control in much the same manner as set out in application Ser. No. 678,585 heretofore mentioned including a series of different colored light filters. It is also obvious that a stationary Polaroid lens may be provided within the receptacle 42 cooperating with a second Poloroid lens operated on the slide member 48 and normally blocking the light. When the Polaroid member on the slide 48 is moved out of position, the light will then pass to activate the photocell.

Figure 8:
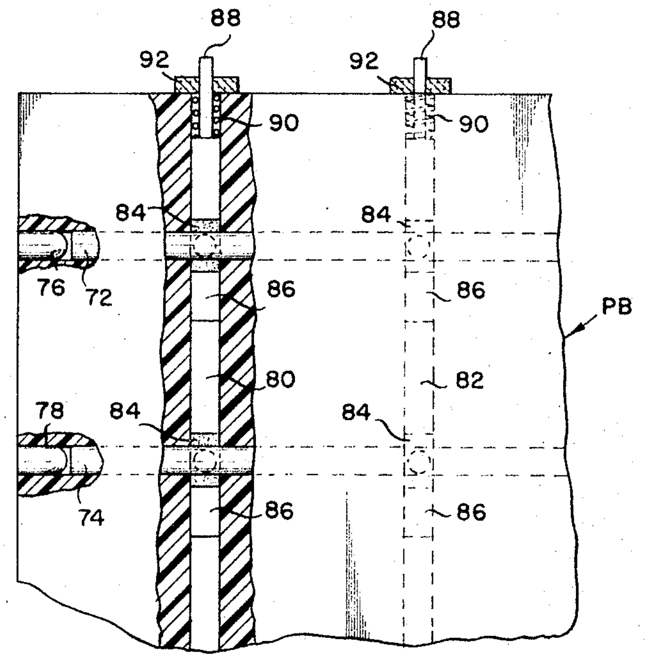
FIGURE 8 is a fragmentary plan view illustrating yet a further embodiment of this invention showing a portion of the cross-bar panel board and its control panel.
Figure 9:
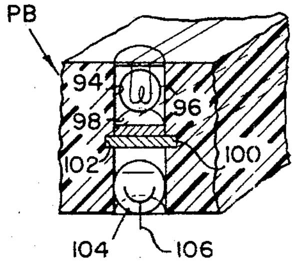
FIGURE 9 is an enlarged fragmentary perspective view of the panel board shown in FIGURE 8, a portion of which is illustrated in cross section.

FIGURES 8 and 9

In FIGURE 8, the panel board PB is provided with a series of wave transmitting members 72 and 74 in the form of rods such as Lucite or fiber optics as set out in my prior applications aforementioned. The light sources 76 and 78 are provided at the end of each rod 72 and 74 respectively. Intersecting the rods 72 and 74 are light valve members 82 and 80. The light valve members are provided with an opaque section 84 and a transparent section 86. The light valve members 80 and 82 are provided with plungers 88 which are spring-biased by springs 90. The plungers are operated by solenoid coils 92 in the manner previously set out in FIGURES 4 through 7. Photocells not shown are positioned beneath the rods or wave transmitters 72 and 74 at the intersections with the light valve members 80 and 82. The solenoids (not shown) are mounted in receptacles (not shown but similar to those mounted in receptacles 42 in FIGURES 4 through 7).

Operation

In operation, the light sources 76 and 78 are operated from a control panel (not shown) as are also the valve slides 80 and 82 operated from the control panel by means of the solenoids 92. Upon operation of any one light source and any one solenoid, the light will be transmitted due to the fact that the solenoid will shift the light valve removing the opaque section 84 from above the photocell and replacing it with a transparent section 86 thereby permitting the light to operate on the photocell in a manner similar to that described heretofore.

F'GURE 9 shows the opening 94 with the light source 96 mounted above a polarized lens 98. The lens 98 is fixed in the opening 94. A slide 100 is provided in a slot 102. The slide 100 has a portion thereof which is also polarized. When the polarized lens 98 is in maching position with the polarized portion of the slide 100, no light is transmitted. When the slide is shifted by means heretofore described, a transparent area will be positioned beneath the lens 98 permitting light to be transmitted to the photocell 104 for operation of an electrical component (not shown) connected to the electrical lead 106.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth as fall within the scope of the invention or the limits of the appended claims.

Having thus described my invention what I claim is:

1. A cross-bar switch comprising:
(a) a panel board
(b) said panel board including a switching grid having a plurality of *x–y* coordinates
(c) each of said *x* coordinates of said switching grid having a plurality of interconnected and simultaneously operated wave transmitting means
(d) each of said *y* coordinates of said switching grid having a plurality of interconnected and simultaneously operated wave transmitting means
(e) wave sensitive means positioned at each intersection of said *x* and *y* coordinates and an *x* and a *y* coordinate transmitting means at each of said intersections in close proximity to said wave sensitive means
(f) means for selectively operating one of said plurality of interconnected wave transmitting means forming an *x* coordinate
(g) means for selectively operating one of said plurality of interconnected wave transmitting means forming a *y* coordinate
(h) means connecting each of said wave sensitive means to an electrical component
(i) said wave sensitive means sensitive to the combined intensity only of one of said wave transmitting means of one *x* coordinate and one of said wave transmitting means of one *y* coordinate,
(j) whereby when any one of said plurality of wave transmitting means of said *x* coordinate and any one of said wave transmitting means of said *y* coordinate are simultaneously operated, the wave sensing means at the intersection thereof will cause its electrical component to function.

2. A cross-bar switch as in claim 1 and wherein:
(a) said wave transmitting and wave sensitive means are light sensitive respectively.

3. A cross-bar switch as in claim 1 and including:
(a) means for varying the intensity of each wave transmitted by said wave transmitting means.

4. A cross-bar switch as in claim 2 and including:
(a) means for varying the intensity of light transmitted by said light transmitting means.

5. A cross-bar switch comprising:
(a) a panel board
(b) said panel board including a switching grid having a plurality of *x–y* coordinates
(c) each of said *x* coordinates of said switching grid having a plurality of interconnected and simultaneously operated signal transmitting means
(d) each of said *y* coordinates of said switching grid having a plurality of interconnected and simultaneously operated signal transmitting means
(e) signal sensitive means positioned at each intersection of said *x* and *y* coordinates and an *x* and a *y* coordinate signal transmitting means of each of said intersections in close proximity to said signal sensitive means
(f) means for selectively operating one of said plurality of interconnected signal transmitting means forming an *x* coordinate
(g) means for selectively operating one of said plurality of interconnected signal transmitting means forming a *y* coordinate (h) means connecting each of said signal sensitive means to an electrical component
(i) said signal sensitive means sensitive to the combined intensity only of one of said signal transmitting means of one *x* coordinate and one of said signal transmitting means of one *y* coordinate
(j) whereby when any one of said plurality of signal transmitting means of said *x* coordinate and any one of said signal transmitting means of said *y* coordinate are simultaneously operated, the signal sensing means at the intersection thereof will cause its electrical component to function.

6. A cross-bar switch as in claim 5 and including:
(a) means for varying the signal intensity of said signal transmitting means.

7. A cross-bar switch comprising:
(a) a panel board
(b) a series of wave form transmitting members positioned in said board for transmitting a series of waves in parallel spaced relation across said board
(c) a series of wave form valves positioned in said panel board in parallel spaced relation to each other and in crossed relation to said series of transmitted waves to form a grid arrangement having spaced intensity areas where said waves and wave form valves intersect
(d) means for selectively operating each of said transmitting members and each of said wave form valves
(e) said spaced intensity areas each having located therein, a wave sensitive element, sensitive only to the intensity of one of said transmitted series of waves when the wave form valve at its intersections is operated, and
(f) means connecting each of said wave sensitive elements to an electrical component.

8. A cross-bar switch as in claim 7 and including:
(a) means for varying the intensity of the waves transmitted by said waveform transmitting means.

9. A cross-bar switch comprising:
(a) a panel board
(b) a series of signal carrying members positioned in said panel board in parallel spaced relation to each other
(c) a series of signal control valves positioned in said panel board in parallel spaced relation to each other and in crossed relation to said series of signal carrying members to form a grid arrangement having spaced intersections
(d) a signal transmitting source for each of said signal carrying members
(e) means for selectively operating each of said signal sources and said signal control valves
(f) said spaced intersections in the zone thereof each having a signal sensitive element sensitive only to the transmitted signal in one of said series of signal carrying members when the signal control valve at its intersection is operated, and
(g) means connecting said signal sensing elements to an electrical component.

10. A cross-bar switch as in claim 9 and including:
(a) means for varying the intensity of the signals transmitted by said signal transmitting sources.

11. A cross-bar switch comprising:
(a) a panel board
(b) a series of light transmitting members positioned in said panel board in parallel spaced relation to each other
(c) a series of light valves positioned in said panel board in parallel spaced relation to each other and in crossed relation to said series of light transmitting members to form a grid arrangement having spaced intersections
(d) a separate light source for each of said light transmitting members (e) means for selectively operating each of said light sources and each of said light valves (f) said spaced intersections in the zone thereof each having located therein a light sensitive element, sensitive only to the transmitted light in one of said light transmitting members when the light valve at its intersection is operated, and (g) means connecting each of said light sensitive elements to an electrical component.

12. A cross-bar switch as in claim 11 and including:

(a) means for varying the light intensity transmitted by said light transmitting members.

13. A cross-bar switch comprising:

(a) a panel board (b) a first series of parallel spaced electrical lines positioned in said panel board and each line having the same number of spaced light sources thereon (c) a second series of parallel spaced electrical lines in crossed relation to said first series of electrical lines and each line of said second series having the same number of light valves thereon (d) the number of said light sources on one line of said first series of parallel lines being equal to the number of light valves on one line of said second series of parallel lines (e) said first and second series of parallel lines being in crossed relation to each other to form a grid arrangement having spaced intersections having one light source and one light valve at each intersection (f) means for selectively operating each of said electrical lines to cause selective operation of said light sources and said light valves (g) said spaced intersections in the zone thereof each having located therein a light sensitive element sensitive element sensitive only to the light emanating from a light source at its intersection when the light valve at its intersections is operated, and (h) means connecting each of said light sensitive elements to an electrical component.

14. A cross-bar switch comprising:

(a) a panel board (b) said panel board including a switching grid having a plurality of *x–y* coordinates (c) each of said *x* coordinates of said switching grid having a plurality of interconnected and simultaneously operated light transmitting means (d) each of said *y* coordinates of said switching grid having a plurality of interconnected and simultaneously operated light valving means (e) light sensitive means positioned at each intersection of said *x* and *y* coordinates (f) means for selectively operating one of said plurality of interconnected light transmitting means forming an *x* coordinate (g) means for selectively operating one of said plurality of interconnected light valving means forming a *y* coordinate, and (h) means connecting each of said light sensitive means to an electrical component (i) whereby when any one of said plurality of light transmitting means and any one of said plurality of light valving means are simultaneously operated, the light sensing means at the intersection thereof will cause its electrical component to function.

15. A cross-bar switch as in claim 14 and including:

(a) means for varying the light intensity transmitted by said light transmitting means.

16. A cross-bar switch as in claim 14 and wherein:

(a) said light valving means each includes a series of solenoid operated shutter means.

17. A cross-bar switch as in claim 14 and wherein:

(a) said light valving means each includes a series of pairs of polarized cooperating lenses.

18. A cross-bar switch as in claim 16 and wherein:

(a) said light valving means each include a series of spaced light transmitting areas and a series of spaced opaque areas.

References Cited

UNITED STATES PATENTS 3,152,257 10/1964 Van Santen et al. __ 250—213 X

RALPH G. NILSON, Primary Examiner

T. N. GRIGSBY, Assistant Examiner

U.S. Cl. X.R.

250—227, 237